US010920057B2

(12) United States Patent
Grestenberger et al.

(10) Patent No.: US 10,920,057 B2
(45) Date of Patent: Feb. 16, 2021

(54) POLYPROPYLENE COMPOSITION FOR FOAMING APPLICATIONS

(71) Applicant: BOREALIS AG, Vienna (AT)

(72) Inventors: Georg Grestenberger, St. Peter in der Au (AT); Susanne Kahlen, Linz (AT); Daniela Mileva, Pichling (AT); Wolfgang Stockreiter, Puchenau (AT); Erwin Kastner, Linz (AT); Jochen Kastl, Wolfsburg (DE)

(73) Assignee: BOREALIS AG, Vienna (AT)

( * ) Notice: Subject to any disclaimer, the term of this patent is extended or adjusted under 35 U.S.C. 154(b) by 17 days.

(21) Appl. No.: 16/463,718

(22) PCT Filed: Dec. 8, 2017

(86) PCT No.: PCT/EP2017/082046
§ 371 (c)(1),
(2) Date: May 23, 2019

(87) PCT Pub. No.: WO2018/104524
PCT Pub. Date: Jun. 14, 2018

(65) Prior Publication Data
US 2019/0284381 A1 Sep. 19, 2019

(30) Foreign Application Priority Data

Dec. 9, 2016 (EP) .................................. 16203274

(51) Int. Cl.
*C08L 23/12* (2006.01)
*C08J 9/00* (2006.01)
*C08F 210/06* (2006.01)

(52) U.S. Cl.
CPC ............ *C08L 23/12* (2013.01); *C08F 210/06* (2013.01); *C08J 9/0061* (2013.01); *C08J 2323/12* (2013.01); *C08J 2423/12* (2013.01); *C08J 2423/14* (2013.01); *C08L 2203/14* (2013.01); *C08L 2205/035* (2013.01); *C08L 2205/16* (2013.01); *C08L 2207/02* (2013.01)

(58) Field of Classification Search
CPC ...... C08F 210/06; C08F 4/6465; C08F 10/00; C08F 4/6492; C08F 110/06; C08F 2500/12; C08F 210/16; C08F 2500/17; C08L 23/12; C08L 23/16; C08L 51/06; C08L 2203/14; C08L 2205/035; C08L 2205/16; C08L 2207/02; C08J 9/0061; C08J 2423/14; C08J 2323/12; C08K 7/14
See application file for complete search history.

(56) References Cited

U.S. PATENT DOCUMENTS

| 4,506,056 A | 3/1985 | Gaylord |
| 4,753,997 A | 6/1988 | Shyu et al. |
| 5,272,236 A | 12/1993 | Lai et al. |
| 2012/0225993 A1* | 9/2012 | Bernreitner et al. ........................ C08L 23/142 524/517 |
| 2015/0368449 A1* | 12/2015 | Kastner et al. ......... C08L 23/10 521/134 |

FOREIGN PATENT DOCUMENTS

| EP | 0787750 A2 | 8/1997 |
| EP | 0879830 A1 | 11/1998 |
| EP | 0887379 A1 | 12/1998 |
| EP | 0890612 A2 | 1/1999 |
| EP | 1805238 B1 | 5/2011 |
| EP | 2738214 A1 | 6/2014 |
| KR | 20140134718 A | 11/2014 |
| WO | 92/12182 A1 | 7/1992 |
| WO | 99/24478 A1 | 5/1999 |
| WO | 99/24479 A1 | 5/1999 |
| WO | 2004/000899 A1 | 12/2003 |
| WO | 2004/111095 A1 | 12/2004 |
| WO | 2013/149915 A1 | 10/2013 |
| WO | 2014/016206 A1 | 1/2014 |
| WO | 2016/005301 A1 | 1/2016 |
| WO | 2016/066453 A2 | 5/2016 |

OTHER PUBLICATIONS

Busico, et al., "Microstructure of polypropylene", Prog. Polym. Sci. 26 (2001), pp. 443-533.
Busico, et al., "Full Assignment of the 13C NMR Spectra of Regioregular Polypropylenes: Methyl and Methylene Region", Macromolecules 1997, 30, pp. 6251-6263.
Busico et al., "Alk-l-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
H.N.Cheng, "13C NMR Analysis of Ethylene-Propylene Rubbers", Macromolecules 1984, 17, 1950-1955.
Resconi et al., "Selectivity in Propene Polymerization with Metallocene Catalysts", Chem. Rev. 2000, 100, pp. 1253-1345.
Wang et al., "Structural Analysis of Ethylene/Propylene Copolymers Synthesized with a Constrained Geometry Catalyst", Macromolecules 2000, 33, pp. 1157-1162.
Zhou et al., "A new decoupling method for accurate quantification of polyethylene copolymer composition and triad sequence distribution with 13C NMR", Journal of Magnetic Resonance 187 (2007) pp. 225-233.
Zweifel, et al., "Plastics Additives Handbook", 6th Edition, Department of Materials, Institute of Polymers, 2008.

(Continued)

*Primary Examiner* — Nathan M Nutter
(74) *Attorney, Agent, or Firm* — Tarolli, Sundheim, Covell & Tummino LLP

(57) ABSTRACT

The present invention is directed to a polypropylene composition (C) comprising a heterophasic propylene copolymer and an inorganic filler, the use of said polypropylene composition (C) for the production of a foamed article and a foamed article obtained from said polypropylene composition (C).

13 Claims, No Drawings

(56) References Cited

OTHER PUBLICATIONS

Wagner, M.H., "Rheotens-Mastercurves and Drawability of Ploymer Melts", Polymer Engineering and Science, 1996, vol. 36, pp. 925-935.
Kakugo et al., "13C NMR Determination of Monomer Sequence Distribution in Ethylene-Propylene Copolymers Prepared with d-TiC13—A1(C2H5)2C1" Macromolecules 1982, 15, pp. 1150-1152.
Singh et al., "Triad sequence determination of ethylene-propylene copolymers—application of quantitative 13C NMR", Polymer Testing 28 (2009) pp. 475-479.
Randall, James, "A Review of High Resolution Liquid 13 Carbon Nuclear Magnetic Resonance Characterizations of Ethylene-Based Polymers", Rev. Macromol. Chem. Phys., C29(2 & 3), 201-317 (1989).
Korean Office Action for Application No. 10-2019-7016546 dated May 26, 2020.

* cited by examiner

POLYPROPYLENE COMPOSITION FOR FOAMING APPLICATIONS

The present invention is directed to a polypropylene composition (C) comprising a heterophasic propylene copolymer and an inorganic filler, the use of said polypropylene composition (C) for the production of a foamed article and a foamed article obtained from said polypropylene composition (C).

One of the major challenges in automotive industry is reducing the weight of a car without losing its mechanical functionality. Since many parts of a car are made out of advanced polypropylene materials, there is also the need to decrease the weight of such polymers. One major step in this direction was reducing the amount of filler in polypropylene materials. A further approach to reduce the weight is to create a sandwich structure comprising two compact skin layers and a foamed inner layer through the injection moulding process. However, finding a balance between the maximum foaming and tool opening degree and a good mechanical performance is challenging. Further, a good surface appearance of the final parts is requested from the automotive industry, especially with regard to components in visible applications.

Accordingly, there is a need in the art for a polypropylene foam featured by good optical and mechanical properties.

Therefore, it is an object of the present invention to provide a polypropylene composition which is foamable in an injection moulding process wherein the resulting foam is featured by a good cell structure, a good surface appearance and at the same time preserving good mechanical properties.

The finding of the present invention is to provide a polypropylene composition (C) comprising a propylene polymer, a heterophasic propylene copolymer and an inorganic filler.

Accordingly, the present invention is directed to a polypropylene composition (C), comprising
 a) at least 20 wt.-%, based on the overall weight of the polypropylene composition (C), of a heterophasic propylene copolymer (HECO1) comprising
  i) a matrix (M) comprising a first propylene polymer (PP1), and
  ii) an elastomeric propylene copolymer (E),
 b) at least 30 wt.-%, based on the overall weight of the polypropylene composition (C), of a second propylene polymer (PP2),
 c) optionally a propylene homopolymer (H-PP3) having a melt flow rate MFR$_2$ (230° C.) determined according to ISO 1133 below 50 g/10 min,
 d) an adhesion promoter (AP), and
 e) an inorganic filler (F),
wherein said first propylene polymer (PP1) and said second propylene polymer (PP2) have melt flow rates MFR$_2$ (230° C.) determined according to ISO 1133 above 50 g/10 min.

According to one embodiment of the present invention, the heterophasic propylene copolymer (HECO1) has a melt flow rate MFR$_2$ (230° C.) determined according to ISO 1133 in the range of 10 to 30 g/10 min.

According to another embodiment of the present invention, the polypropylene composition (C) comprises
 a) 20 to 40 wt.-% of the heterophasic propylene copolymer (HECO1) comprising the first propylene copolymer (PP1) and the elastomeric propylene copolymer (E),
 b) 30 to 55 wt.-% of the second propylene polymer (PP2),
 c) optionally 5 to 25 wt.-% of the propylene homopolymer (H-PP3),
 d) 0.5 to 5 wt.-% of the adhesion promoter (AP), and
 e) 10 to 30 wt.-% of the inorganic filler (F),
based on the overall weight of the polypropylene composition (C).

It is especially preferred that the inorganic filler (F) is glass fibers.

According to a further embodiment of the present invention, the adhesion promoter (AP) is a polar modified polypropylene (PM-PP) being a propylene homo- or copolymer grafted with maleic anhydride preferably having a melt flow rate MFR (190° C.) determined according to ISO 1133 of at least 50 g/10 min.

According to still another embodiment of the present invention, the heterophasic propylene copolymer (HECO1) has
 i) a comonomer content in the range of 5.0 to 35.0 mol-%, and/or
 ii) a xylene soluble fraction (XCS) in the range of 15.0 to 40.0 wt.-%,
 based on the overall weight of the heterophasic propylene copolymer (HECO1).

According one embodiment of the present invention, the heterophasic propylene copolymer (HECO1) has an intrinsic viscosity of the xylene soluble fraction (XCS) measured according to ISO 1628/1 (at 135° C. in decalin) in the range of 1.0 to 4.5 dl/g.

It is especially preferred that the first propylene polymer (PP1) and/or the second propylene polymer (PP2) are propylene homopolymers.

According another embodiment of the present invention, the elastomeric propylene copolymer (E) is a copolymer of propylene and ethylene.

According to a further embodiment of the present invention, the polypropylene composition (C) has a melt flow rate MFR$_2$ (230° C.) determined according to ISO 1133 in the range of 8 to 30 g/10 min.

According to still another embodiment of the present invention, the polypropylene composition (C) is a foamable polypropylene composition.

The present invention is further directed to the use of the polypropylene composition (C) as described above for the production of a foamed article.

The present invention is also directed to a foamed article, comprising the polypropylene composition (C) as described above.

It is especially preferred that said foamed article is an automotive article.

In the following, the present invention is described in more detail.

The Polypropylene Composition (C)

The polypropylene composition (C) according to the present invention comprises a heterophasic propylene copolymer (HECO1), said heterophasic propylene copolymer (HECO1) comprising a matrix (M) comprising a first propylene polymer (PP1) and an elastomeric propylene copolymer (E), a second propylene polymer (PP2) and optionally a propylene homopolymer (H-PP3). Accordingly, the polypropylene composition (C) can also be considered as a heterophasic system (HECO) wherein the first propylene polymer (PP1), the second propylene polymer (PP2) and optionally the propylene homopolymer (H-PP3) form the matrix (M) and the elastomeric propylene copolymer (E) forms the dispersed phased. Thus the matrix (M) contains (finely) dispersed inclusions being not part of the matrix (M)

and said inclusions contain the elastomeric propylene copolymer (E). The term inclusion indicates that the matrix (M) and the inclusion form different phases as defined below.

The heterophasic system (HECO) comprises at least 80 wt.-% of the matrix (M) comprising the first propylene polymer (PP1), the second propylene polymer (PP2) and optionally the propylene homopolymer (H-PP3) and at least 10 wt.-% of the elastomeric propylene copolymer (E). It is especially preferred that the heterophasic system (HECO) comprises, preferably consists of, 80 to 90 wt.-%, more preferably 81 to 88 wt.-%, still more preferably 83 to 87 wt.-% of the matrix (M) comprising the first propylene polymer (PP1), the second propylene polymer (PP2) and optionally the propylene homopolymer (H-PP3) and 10 to 20 wt.-%, more preferably 12 to 19 wt.-%, still more preferably 13 to 17 wt.-% of the elastomeric propylene copolymer (E), based on the overall weight of the heterophasic system (HECO).

Preferably, the heterophasic system (HECO) contains the first propylene polymer (PP1) and the second propylene polymer (PP2) forming the matrix (M) in a ratio of 1:1.5 to 1:3.5, more preferably in a ratio of 1:1.6 to 1:3.0, still more preferably in a ratio of 1:1.8 to 1:2.7.

In case the matrix (M) also comprises the propylene homopolymer (H-PP3), it is preferred that the ratio between the combined first propylene polymer (PP1) and second propylene polymer (PP2) and the propylene homopolymer (H-PP3) [(PP1+PP2)/H-PP3] is below 10, more preferably in the range of 2 to 8, still more preferably in the range of 3 to 6.

Accordingly, it is preferred that the heterophasic system (HECO) comprises 20 to 32 wt.-%, more preferably 22 to 30 wt.-%, still more preferably 23 to 37 wt.-% of the first propylene polymer (PP1), 50 to 68 wt.-%, more preferably 52 to 66 wt.-%, still more preferably 54 to 65 wt.-% of the second propylene polymer (PP2), optionally 5 to 25 wt.-%, more preferably 7 to 20 wt.-%, still more preferably 10 to 15 wt.-% of the propylene homopolymer (H-PP3) and 10 to 20 wt.-%, more preferably 12 to 19 wt.-%, still more preferably 13 to 17 wt.-% of the elastomeric propylene copolymer (E), based on the overall weight of the heterophasic system (HECO).

Furthermore, it is preferred that the melt flow rates MFR (230° C.) determined according to ISO 1133 of the first propylene polymer (PP1) and the second propylene polymer (PP2) are higher than the melt flow rate MFR (230° C.) determined according to ISO 1133 of the propylene homopolymer (H-PP3). Accordingly, it is preferred that the ratio [MFR(PP1)/MFR(H-PP3)] and/or the ratio [MFR(PP1)/MFR(H-PP3)] is equal or below 15, more preferably in the range of 1 to 12, still more preferably in the range of 3 to 10, wherein MFR(PP1) is the melt flow rate MFR (230° C.) of the first propylene polymer (PP1), MFR(PP2) is the melt flow rate MFR (230° C.) of the second propylene polymer (PP2), and MFR(H-PP3) is the melt flow rate MFR (230° C.) of the propylene homopolymer (H-PP3), determined according to ISO 1133, respectively.

The inventive polypropylene composition (C) also comprises an adhesion promoter (AP). It is preferred that said adhesion promoter (AP) comprises maleic anhydride.

Further, the inventive polypropylene composition comprises an inorganic filler (F).

Accordingly, it is preferred that the polypropylene composition (C) comprises 50 to 80 wt.-%, more preferably 51 to 75 wt.-%, still more preferably 52 to 69 wt.-% of the matrix (M), 5 to 20 wt.-%, more preferably 7 to 15 wt.-%, still more preferably 8 to 12 wt.-% of the elastomeric propylene copolymer (E), optionally 5 to 25 wt.-%, more preferably 7 to 20 wt.-%, still more preferably 10 to 15 wt.-% of the propylene homopolymer (H-PP3), 0.5 to 5 wt.-%, more preferably 0.8 to 2 wt.-%, still more preferably 1.2 to 1.5 wt.-% of the adhesion promoter (AP) and 10 to 30 wt.-%, more preferably 15 to 25 wt.-%, still more preferably 18 to 22 wt.-% of the inorganic filler (F), based on the overall weight of the polypropylene composition (C).

As outlined above, the matrix (M) of the heterophasic system (HECO) comprises, preferably consists of, a first propylene polymer (PP1), a second propylene polymer (PP2) and optionally a propylene homopolymer (H-PP3).

Preferably, the polypropylene composition (C) contains the first propylene polymer (PP1), the second propylene polymer (PP2) and optionally the propylene homopolymer (H-PP3) forming the matrix (M) of the heterophasic propylene copolymer (HECO) in a ratio of 1.2:2.3:1.0 to 1.8:4.0:1.0.

Therefore, it is preferred that the polypropylene composition (C) comprises, more preferably consists of, 12 to 27 wt.-%, more preferably 15 to 25 wt.-%, still more preferably 17 to 20 wt.-% of the first propylene polymer (PP1), 30 to 55 wt.-%, more preferably 32 to 50 wt.-%, still more preferably 34 to 49 wt.-% of the second propylene polymer (PP2), 5 to 20 wt.-%, more preferably 7 to 15 wt.-%, still more preferably 8 to 12 wt.-% of the elastomeric propylene copolymer (E), optionally 5 to 25 wt.-%, more preferably 7 to 20 wt.-%, still more preferably 10 to 15 wt.-% of the propylene homopolymer (H-PP3), 0.5 to 5 wt.-%, more preferably 0.8 to 2 wt.-%, still more preferably 1.2 to 1.5 wt.-% of the adhesion promoter (AP) and 10 to 30 wt.-%, more preferably 15 to 25 wt.-%, still more preferably 18 to 22 wt.-% of the inorganic filler, based on the overall weight of the polypropylene composition (C).

Preferably, the polypropylene composition (C) is obtained by a sequential polymerization process wherein at least two, like three, reactors are connected in series. For example, said process comprises the steps of a) polymerizing propylene and optionally ethylene in a first reactor (R1) to obtain the first propylene polymer (PP1), b) transferring the first propylene polymer (PP1) into a second reactor (R2), c) polymerizing in said second reactor (R2) in the presence of said first propylene polymer (PP1) propylene and optionally ethylene obtaining the second propylene polymer (PP2), said first propylene polymer (PP1) and said second propylene polymer (PP2) form the matrix (M), d) optionally transferring the matrix (M) into a third reactor (R3), e) optionally polymerizing in said third reactor (R3) in the presence of said first propylene polymer (PP1) and said second propylene polymer (PP2) propylene obtaining the propylene homopolymer (H-PP3), said first propylene polymer (PP1), said second propylene polymer (PP2) and said propylene homopolymer (H-PP3) form the matrix (M)

f) transferring the matrix (M) into a fourth reactor (R4), g) polymerizing in said fourth reactor (R4) in the presence of the matrix (M) propylene and/or a $C_4$ to $C_8$ α-olefin, obtaining a third polymer fraction, said polymer fraction is the elastomeric copolymer (E), h) melt blending the composition obtained in the fourth reactor (R4) with the inorganic filler (F) and the adhesion promoter (AP).

Alternatively, the polypropylene composition (C) is obtained by melt blending the second propylene polymer (PP2) with a heterophasic propylene copolymer (HECO1) comprising a matrix being the first propylene polymer (PP1) and a dispersed phase being the elastomeric propylene copolymer (E), the inorganic filler (F) and optionally the propylene homopolymer (H-PP3). Melt blending of said second propylene polymer (PP2) and said heterophasic propylene copolymer (HECO1) results in a heterophasic system wherein the second propylene polymer (PP2), the first propylene polymer (PP1) and optionally the propylene homopolymer (H-PP3) form the matrix and the elastomeric propylene copolymer (E) forms the dispersed phase.

It is especially preferred that the polypropylene composition (C) is obtained by melt blending said second propylene polymer (PP2) and said heterophasic propylene copolymer (HECO1) with the inorganic filler (F), the adhesion promoter (AP) and optionally the propylene homopolymer (H-PP3).

Accordingly, it is preferred that the polypropylene composition (C) comprises 20 to 40 wt.-%, more preferably 25 to 35 wt.-% still more preferably 27 to 30 wt.-% of the heterophasic propylene copolymer (HECO1), 30 to 55 wt.-%, more preferably 32 to 50 wt.-%, still more preferably 34 to 49 wt.-% of the second propylene polymer (PP2), optionally 5 to 25 wt.-%, more preferably 7 to 20 wt.-%, still more preferably 10 to 15 wt.-% of the propylene homopolymer (H-PP3), 0.5 to 5 wt.-%, more preferably 0.8 to 2 wt.-%, still more preferably 1.2 to 1.5 wt.-% of the adhesion promoter (AP) and 10 to 30 wt.-%, more preferably 15 to 25 wt.-%, still more preferably 18 to 22 wt.-% of the inorganic filler, based on the overall weight of the polypropylene composition (C).

The polypropylene composition (C) of the present invention may include additives (AD).

Accordingly, it is preferred that the polypropylene composition (C) comprises, preferably consists of, 20 to 40 wt.-%, more preferably 25 to 35 wt.-% still more preferably 27 to 30 wt.-% of the heterophasic propylene copolymer (HECO1), 30 to 55 wt.-%, more preferably 32 to 50 wt.-%, still more preferably 34 to 49 wt.-% of the second propylene polymer (PP2), optionally 5 to 25 wt.-%, more preferably 7 to 20 wt.-%, still more preferably 10 to 15 wt.-% of the propylene homopolymer (H-PP3), 0.5 to 5 wt.-%, more preferably 0.8 to 2 wt.-%, still more preferably 1.2 to 1.5 wt.-% of the adhesion promoter (AP) and 10 to 30 wt.-%, more preferably 15 to 25 wt.-%, still more preferably 18 to 22 wt.-% of the inorganic filler and 0.05 to 5 wt.-%, preferably 0.1 to 3 wt.-% of additives (AD), based on the overall weight of the polypropylene composition (C). The additives (AD) are described in more detail below.

Preferably the polypropylene composition (C) of the invention does not comprise (a) further polymer(s) different to the second propylene polymer (PP2), the first propylene polymer (PP1), the elastomeric propylene copolymer (E), the adhesion promoter (AP) and optionally the propylene homopolymer (H-PP3) in an amount exceeding 15 wt.-%, preferably in an amount exceeding 10 wt.-%, more preferably in an amount exceeding 9 wt.-%, based on the overall weight of the polypropylene composition (C).

It is preferred that the polypropylene composition (C) has a moderate melt flow rate. Thus, it is preferred that the melt flow rate $MFR_2$ (230° C.) determined according to ISO 1133 of the polypropylene composition (C) is in the range of 8 to 30 g/10 min, more preferably in the range of 10 to 16 g/10 min, still more preferably in the range of 11 to 13 g/10 min.

Further, it is preferred that the ratio between the melt flow rate MFR (230° C.) determined according to ISO 1133 of the propylene homopolymer (H-PP3) and the combined melt flow rates MFR (230° C.) determined according to ISO 1133 of the first propylene polymer (PP1) and the second propylene polymer (PP2) [MFR(H-PP3)/(MFR(PP1)+(MFR(PP2))] is in the range of 0.001 to 1.0, more preferably in the range of 0.02 to 0.2, still more preferably in the range of 0.06 to 0.16, wherein MFR(PP1) is the melt flow rate MFR (230° C.) of the first propylene polymer (PP1), MFR(PP2) is the melt flow rate MFR (230° C.) of the second propylene polymer (PP2), and MFR(H-PP3) is the melt flow rate MFR (230° C.) of the propylene homopolymer (H-PP3), determined according to ISO 1133, respectively.

In the following, the heterophasic propylene copolymer (HECO1), the second propylene polymer (PP2), the propylene homopolymer (H-PP3), the adhesion promoter (AP) and the inorganic filler (F) are described in more detail.

The Heterophasic Propylene Copolymer (HECO1)

The inventive polypropylene composition (C) comprises a heterophasic propylene copolymer (HECO1).

The first heterophasic propylene copolymer (HECO1) according to this invention comprises a matrix (M) being the first propylene polymer (PP1) and dispersed therein an elastomeric propylene copolymer (E). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (HECO1). The presence of second phases or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Accordingly, the heterophasic composition (HECO1) according to this invention preferably comprises
  (a) the (semi)crystalline first propylene polymer (PP1) as the matrix (M) and
  (b) the elastomeric propylene copolymer (E).

Preferably the weight ratio between the first propylene polymer (PP1) and the elastomeric propylene copolymer (E) [PP1/E] of the heterophasic composition (HECO1) is in the range of 90/10 to 40/60, more preferably in the range of 85/15 to 45/55, yet more preferably in the range of 83/17 to 50/50, like in the range of 82/18 to 60/40.

Preferably, the heterophasic propylene copolymer (HECO1) according to this invention comprises as polymer components only the first propylene polymer (PP1) and the elastomeric propylene copolymer (E). In other words, the heterophasic propylene copolymer (HECO1) may contain further additives but no other polymer in an amount exceeding 5.0 wt.-%, more preferably exceeding 3.0 wt.-%, like exceeding 1.0 wt.-%, based on the total heterophasic propylene copolymer (HECO1). One additional polymer which may be present in such low amounts is a polyethylene which is a by-reaction product obtained by the preparation of the second heterophasic propylene copolymer (HECO1). Accordingly, it is in particular appreciated that the heterophasic propylene copolymer (HECO1) contains only the first propylene polymer (PP1), the elastomeric propylene copolymer (E) and optionally polyethylene in amounts as mentioned in this paragraph.

The first heterophasic propylene copolymer (HECO1) applied according to this invention is featured by a moderate melt flow rate. Accordingly, the heterophasic propylene copolymer (HECO1) has a melt flow rate MFR$_2$ (230° C.) in the range of 10 to 30 g/10 min, preferably in the range of 12 to 25 g/10 min, more preferably in the range of 16 to 20 g/10 min.

Preferably, it is desired that the heterophasic propylene copolymer (HECO1) is thermo mechanically stable. Accordingly, it is appreciated that the heterophasic propylene copolymer (HECO1) has a melting temperature of at least 160° C., more preferably in the range of 162 to 170° C., still more preferably in the range of 163 to 167° C.

The heterophasic propylene copolymer (HECO1) comprises apart from propylene also comonomers. Preferably the heterophasic propylene copolymer (HECO1) comprises apart from propylene ethylene and/or C$_4$ to C$_8$ α-olefins. Accordingly, the term "propylene copolymer" according to this invention is understood as a polypropylene comprising, preferably consisting of, units derivable from (a) propylene
and
(b) ethylene and/or C$_4$ to C$_8$ α-olefins.

Thus, the heterophasic propylene copolymer (HECO1), i.e. first propylene polymer (PP1) as well as the elastomeric propylene copolymer (E), can comprise monomers copolymerizable with propylene, for example comonomers such as ethylene and/or C$_4$ to C$_8$ α-olefins, in particular ethylene and/or C$_4$ to C$_8$ α-olefins, e.g. 1-butene and/or 1-hexene. Preferably, the heterophasic propylene copolymer (HECO1) according to this invention comprises, especially consists of, monomers copolymerizable with propylene from the group consisting of ethylene, 1-butene and 1-hexene. More specifically, the heterophasic propylene copolymer (HECO1) of this invention comprises—apart from propylene—units derivable from ethylene and/or 1-butene. In a preferred embodiment, the heterophasic propylene copolymer (HECO1) according to this invention comprises units derivable from ethylene and propylene only. Still more preferably the first propylene polymer (PP1) as well as the first elastomeric propylene copolymer (E) of the heterophasic propylene copolymer (HECO1) contain the same comonomers, like ethylene.

Additionally, it is appreciated that the heterophasic propylene copolymer (HECO1) preferably has moderate total comonomer content, preferably ethylene content. Thus, it is preferred that the comonomer content of the heterophasic propylene copolymer (HECO1) is in the range from 5.0 to 35.0 mol-%, preferably in the range from 8.0 to 20.0 mol-%, more preferably in the range from 9.0 to 15.0 mol-%, like in the range of 10.0 to 12.0 mol-%.

The xylene cold soluble (XCS) fraction measured according to according ISO 16152 (25° C.) of the heterophasic propylene copolymer (HECO1) is in the range of 15.0 to 40.0 wt.-%, preferably in the range from 20.0 to 35.0 wt.-%, more preferably in the range from 22.0 to 32.0 wt.-%, still more preferably in the range from 27.0 to 30.0 wt.-%, based on the overall weight of the heterophasic propylene copolymer (HECO1).

Further it is appreciated that the xylene cold soluble (XCS) fraction of the heterophasic propylene copolymer (HECO1) is specified by its intrinsic viscosity. A low intrinsic viscosity (IV) value reflects a low weight average molecular weight. For the present invention it is appreciated that the xylene cold soluble fraction (XCS) of the heterophasic propylene copolymer (HECO1) has an intrinsic viscosity (IV) measured according to ISO 1628/1 (at 135° C. in decalin) in the range of 1.0 to 4.5 dl/g, preferably in the range of 1.5 to 4.0 dl/g, more preferably in the range of 1.8 to 3.8 dl/g.

Additionally, it is preferred that the comonomer content, i.e. ethylene content, of the xylene cold soluble (XCS) fraction of the heterophasic propylene copolymer (HECO1) is equal or above 30 mol-%, preferably in the range of 32 to 65 mol-%, more preferably in the range of 35 to 60 mol.-%, yet more preferably in the range of 38 to 55 mol.-%. The comonomers present in the xylene cold soluble (XCS) fraction are those defined above for the first propylene polymer (PP1) and the elastomeric propylene copolymer (E), respectively. In one preferred embodiment the comonomer is ethylene only.

The heterophasic propylene copolymer (HECO1) can be further defined by its individual components, i.e. the first propylene polymer (PP1) and the elastomeric propylene copolymer (E).

The first propylene polymer (PP1) can be a propylene copolymer or a propylene homopolymer, the latter being preferred.

In case the first propylene polymer (PP1) is a propylene copolymer, the first propylene polymer (PP1) comprises monomers copolymerizable with propylene, for example comonomers such as ethylene and/or C$_4$ to C$_8$ α-olefins, in particular ethylene and/or C$_4$ to C$_6$ α-olefins, e.g. 1-butene and/or 1-hexene. Preferably the first propylene polymer (PP1) according to this invention comprises, especially consists of, monomers copolymerizable with propylene from the group consisting of ethylene, 1-butene and 1-hexene. More specifically the first propylene polymer (PP1) of this invention comprises—apart from propylene—units derivable from ethylene and/or 1-butene. In a preferred embodiment the first propylene polymer (PP1) comprises units derivable from ethylene and propylene only.

The first propylene polymer (PP1) according to this invention has a melt flow rate MFR$_2$ (230° C./2.16 kg) measured according to ISO 1133 above 50 g/10 min, more preferably in the range of 70 to 90 g/10 min, more preferably in the range of 75 to 88 g/10 min, still more preferably in the range of 80 to 88 g/10 min.

The comonomer content of the first propylene polymer (PP1) is in the range of 0.0 to 5.0 mol-%, yet more preferably in the range of 0.0 to 3.0 mol-%, still more preferably in the range of 0.0 to 1.0 mol-%. It is especially preferred that the first propylene polymer (PP1) is a propylene homopolymer (H-PP1).

The heterophasic propylene copolymer (HECO1) preferably comprises 50 to 90 wt.-%, more preferably 60 to 80 wt.-%, still more preferably 63 to 70 wt.-% of the first propylene polymer (PP1), based on the total weight of the heterophasic propylene copolymer (HECO1).

Additionally, the first heterophasic propylene copolymer (HECO1) preferably comprises 10 to 50 wt.-%, more preferably 20 to 40 wt.-%, still more preferably 30 to 37 wt.-% of the elastomeric propylene copolymer (E), based on the total weight of the heterophasic propylene copolymer (HECO1).

Thus, it is appreciated that the heterophasic propylene copolymer (HECO1) preferably comprises, more preferably consists of, 50 to 90 wt.-%, more preferably 60 to 80 wt.-%, still more preferably 63 to 70 wt.-% of the first propylene polymer (PP1), like the propylene homopolymer (H-PP1), and 10 to 50 wt.-%, more preferably 20 to 40 wt.-%, still more preferably 30 to 37 wt.-% of the elastomeric propylene copolymer (E), based on the total weight of the heterophasic propylene copolymer (HECO1).

Accordingly, a further component of the heterophasic propylene copolymer (HECO1) is the elastomeric propylene copolymer (E) dispersed in the matrix (M) being the first propylene polymer (PP1). Concerning the comonomers used in the elastomeric propylene copolymer (E) it is referred to the information provided for the heterophasic propylene copolymer (HECO1). Accordingly, the elastomeric propylene copolymer (E) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric propylene copolymer (E) comprises, especially consists of, monomers copolymerizable with propylene from the group consisting of ethylene, 1-butene and 1-hexene. More specifically, the elastomeric propylene copolymer (E) comprises—apart from propylene—units derivable from ethylene and/or 1-butene. Thus, in an especially preferred embodiment the elastomeric propylene copolymer (E) comprises units derivable from ethylene and propylene only.

The comonomer content of the elastomeric propylene copolymer (E) preferably is in the range of 60.0 to 85.0 mol-%, more preferably in the range of 70.0 to 80.0 mol-%, still more preferably in the range of 72.0 to 76.0 mol-%.

The heterophasic propylene copolymer (HECO1) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

The second heterophasic propylene copolymer (HECO1) can be produced by blending the first propylene polymer (PP1) and the elastomeric propylene copolymer (E). However, it is preferred that the heterophasic propylene copolymer (HECO1) is produced in a sequential step process, using reactors in serial configuration and operating at different reaction conditions. As a consequence, each fraction prepared in a specific reactor may have its own molecular weight distribution and/or comonomer content distribution.

The heterophasic propylene copolymer (HECO1) according to this invention is preferably produced in a sequential polymerization process, i.e. in a multistage process, known in the art, wherein the first propylene polymer (PP1) is produced at least in one slurry reactor, preferably in a slurry reactor and optionally in a subsequent gas phase reactor, and subsequently the elastomeric propylene copolymer (E) is produced at least in one, i.e. one or two, gas phase reactor(s).

Accordingly it is preferred that the heterophasic propylene copolymer (HECO1) is produced in a sequential polymerization process comprising the steps of
(a) polymerizing propylene and optionally at least one ethylene and/or $C_4$ to $C_{12}$ α-olefin in a first reactor (R1) obtaining first propylene polymer (PP1), preferably said first propylene polymer (PP1) is a propylene homopolymer,
(b) transferring the first propylene polymer (PP1) into a second reactor (R2),
(c) polymerizing in the second reactor (R2) and in the presence of said first propylene polymer (PP1) propylene and at least one ethylene and/or $C_4$ to $C_{12}$ α-olefin obtaining thereby the first propylene copolymer fraction (EC1),
(d) transferring the first propylene polymer (PP1) and the first propylene copolymer fraction (EC1) of step (c) into a third reactor (R3),
(e) polymerizing in the third reactor (R3) and in the presence of the first propylene polymer (PP1) and the first propylene copolymer fraction (EC1) obtained in step (c) propylene and ethylene to obtain the second propylene copolymer fraction (EC2), the first propylene polymer (PP1), the first propylene copolymer fraction (EC1) and the second propylene copolymer fraction (EC2) form the heterophasic propylene copolymer (HECO1).

Of course, in the first reactor (R1) the second polypropylene fraction can be produced and in the second reactor (R2) the first polypropylene fraction can be obtained. The same holds true for the elastomeric propylene copolymer phase.

Preferably between the second reactor (R2) and the third reactor (R3) the monomers are flashed out.

The term "sequential polymerization process" indicates that the heterophasic propylene copolymer (HECO1) is produced in at least two, like three or four reactors connected in series. Accordingly, the present process comprises at least a first reactor (R1) and a second reactor (R2), more preferably a first reactor (R1), a second reactor (R2), and a third reactor (R3). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) is preferably a gas phase reactor (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) is a gas phase reactors (GPR). Accordingly for the instant process at least three, preferably three polymerization reactors, namely two slurry reactors (SR), like two loop reactors (LR), and a gas phase reactor (GPR-1) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the first heterophasic propylene copolymer (HECO1) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3), preferably in the second gas phase reactor (GPR-2) is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The first heterophasic propylene copolymer (HECO1) according to this invention is preferably produced in the presence of
(a) a Ziegler-Natta catalyst (ZN-C1) comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

This Ziegler-Natta catalyst (ZN-C1) can be any stereospecific Ziegler-Natta catalyst for propylene polymerization, which preferably is capable of catalysing the polymerization and copolymerization of propylene and optional comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C1) comprises a high-yield Ziegler-Natta type catalyst including an internal donor component, which can be used at high polymerization temperatures of 80° C. or more. Such high-yield Ziegler-Natta catalyst (ZN-C1) can comprise a succinate, a diether, a phthalate etc., or mixtures therefrom as internal donor (ID) and are for example commercially available from Lyondell-Basell. An example for a suitable catalyst is the catalyst ZN 104 of LyondellBasell.

Additional suitable catalysts are described for example in EP 2738214 A1 and WO 2016/066453 A1.

The Ziegler-Natta catalyst (ZN-C1) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

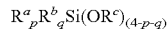

$R^a_p R^b_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula

$Si(OCH_2CH_3)_3(NR^3R^4)$ wherein R3 and R4 can be the same or different a represent a hydrocarbon group having 1 to 12 carbon atoms.

R3 and R4 are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R3 and R4 are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^3$ and $R^4$ are the same, yet more preferably both $R^3$ and $R^4$ are an ethyl group.

Especially preferred external donors (ED) are the dicyclopentyl dimethoxy silane donor (D donor) or the cyclohexylmethyl dimethoxy silane donor (C-Donor).

In addition to the Ziegler-Natta catalyst (ZN-C1) and the optional external donor (ED) a cocatalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Preferably the ratio between the co-catalyst (Co) and the external donor (ED) [Co/ED] and/or the ratio between the co-catalyst (Co) and the transition metal (TM) [Co/TM] should be carefully chosen.

Accordingly,
(a) the mol-ratio of co-catalyst (Co) to external donor (ED) [Co/ED] must be in the range of 5 to 45, preferably is in the range of 5 to 35, more preferably is in the range of 5 to 25;
and optionally
(b) the mol-ratio of co-catalyst (Co) to titanium compound (TC) [Co/TC] must be in the range of above 80 to 500, preferably is in the range of 100 to 350, still more preferably is in the range of 120 to 300.

The Second Propylene Polymer (PP2)

The inventive polypropylene composition (C) comprises a second propylene polymer (PP2).

As outlined above, the second propylene polymer (PP2) and the first propylene polymer (PP1) form the matrix (M) of a heterophasic propylene copolymer (HECO). Accordingly, it is preferred that the second propylene polymer (PP2) is a (semi)crystalline propylene polymer.

The second propylene polymer (PP2) according to this invention can be a propylene copolymer or a propylene homopolymer, the latter being preferred.

In case the second propylene polymer (PP2) is a propylene copolymer, the second propylene polymer (PP2) comprises apart from propylene also comonomers. Preferably the second propylene polymer (PP2) comprises apart from propylene ethylene and/or $C_4$ to $C_8$ α-olefins. Accordingly, the term "propylene copolymer" according to this invention is understood as a polypropylene comprising, preferably consisting of, units derivable from
(a) propylene
and
(b) ethylene and/or $C_4$ to $C_8$ α-olefins.

Thus, the second propylene polymer (PP2), can comprise monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably, second propylene polymer (PP2) according to this invention comprises, especially consists of, monomers copolymerizable with propylene from the group consisting of ethylene, 1-butene and 1-hexene. More specifically, the second propylene polymer (PP2) of this invention comprises—apart from propylene—units derivable from ethylene and/or 1-butene. In case the first propylene polymer (PP1) is a propylene copolymer, it is preferred that the first propylene polymer (PP1) and the second propylene polymer (PP2) comprise the same comonomer, like ethylene. In a preferred embodiment, the second propylene polymer (PP2) according to this invention comprises units derivable from ethylene and propylene only.

The comonomer content of the second propylene polymer (PP2) is in the range of 0.0 to 5.0 mol-%, yet more preferably in the range of 0.0 to 3.0 mol-%, still more preferably in the range of 0.0 to 1.0 mol-%. It is especially preferred that the second propylene polymer (PP2) is a propylene homopolymer.

Preferably, it is desired that the second propylene polymer (PP2) is thermo mechanically stable. Accordingly, it is appreciated that the second propylene polymer (PP2) has a melting temperature of at least 160° C., more preferably in the range of 162 to 170° C., still more preferably in the range of 163 to 167° C.

The second propylene polymer (PP2) according to this invention has a melt flow rate $MFR_2$ (230° C./2.16 kg) measured according to ISO 1133 of more than 50 g/10 min, preferably in the range of 60 to 80 g/10 min, more preferably in the range of 65 to 77 g/10 min, still more preferably in the range of 70 to 75 g/10 min.

The first propylene polymer (PP1) and the second propylene polymer (PP2) according to the present invention can be different or identical. It is preferred that the first propylene polymer (PP1) and the second propylene polymer (PP2) have different melt flow rates MFR (230° C.) determined according to ISO 1133. Preferably, the first propylene polymer (PP1) has a higher melt flow rate MFR (230° C.) determined according to ISO 1133 than the second propylene polymer (PP2).

The second propylene polymer (PP2) may be produced in a process comprising one reactor or in a sequential polymerization process comprising at least two reactors connected in series.

The term "sequential polymerization process" indicates that the second propylene polymer (PP2) is produced in at least two reactors connected in series. Accordingly, the present process comprises at least a first reactor and optionally a second reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the second propylene polymer (PP2) as defined above the conditions for the first reactor, i.e. the slurry reactor, like a loop reactor, may be as follows:

the temperature is within the range of 62° C. to 85° C., preferably between 65° C. and 82° C., more preferably between 67 and 80° C., the pressure is within the range of 20 bar to 80 bar, preferably between 35 bar to 70 bar, hydrogen can be added for controlling the molar mass in a manner known per se.

If desired, the polymerization may be effected in a known manner under supercritical conditions in the first reactor, i.e. in the slurry reactor, like in the loop reactor, and/or as a condensed mode in the gas phase reactors.

The second propylene polymer (PP2) according to this invention is preferably produced in the presence of (a) a Ziegler-Natta catalyst (ZN-C2) comprising compounds (TC) of a transition metal of Group 4 to 6 of IUPAC, a Group 2 metal compound (MC) and an internal donor (ID);

(b) optionally a co-catalyst (Co), and (c) optionally an external donor (ED).

This Ziegler-Natta catalyst (ZN-C2) can be any stereo-specific Ziegler-Natta catalyst (ZN-C2) for propylene polymerization, which preferably is capable of catalysing the polymerization and copolymerization of propylene and optional comonomers at a pressure of 500 to 10000 kPa, in particular 2500 to 8000 kPa, and at a temperature of 40 to 110° C., in particular of 60 to 110° C.

Preferably, the Ziegler-Natta catalyst (ZN-C2) comprises a high-yield Ziegler-Natta type catalyst including an internal donor component, which can be used at high polymerization temperatures of 80° C. or more. Such high-yield Ziegler-Natta catalyst (ZN-C2) can comprise a succinate, a diether, a phthalate etc., or mixtures therefrom as internal donor (ID) and are for example commercially available from Lyondell-Basell. An example for a suitable catalyst is the catalyst ZN M1 of LyondellBasell.

Additional suitable catalysts are described for example in EP 2738214 A1 and WO 2016/066453 A1.

The Ziegler-Natta catalyst (ZN-C2) is preferably used in association with an alkyl aluminum cocatalyst and optionally external donors.

Regarding suitable external donors (ED), reference is made to the definitions provided above with regard to the first heterophasic propylene copolymer (HECO1).

The Propylene Homopolymer (H-PP3)

The inventive polypropylene composition (C) further comprises a propylene homopolymer (H-PP3).

The expression "propylene homopolymer" used in the instant invention relates to a polypropylene that consists substantially, i.e. of more than 99.70 mol-%, still more preferably of at least 99.80 mol-%, of propylene units. In a preferred embodiment only propylene units in the propylene homopolymer are detectable.

Accordingly, it is preferred that the propylene homopolymer (H-PP3) has a xylene soluble content (XCS) below 5.0 wt.-%, more preferably below 4.0 wt.-%, still more preferably below 3.5 wt.-%.

It is preferred that the propylene homopolymer (H-PP3) has a rather low melt flow rate. Accordingly, the melt flow rate (230° C.) measured according to ISO 1133 of the propylene homopolymer (H-PP3) is preferably in the range of 5 to 35.0 g/10 min, more preferably in the range of 8 to 32 g/10 min, still more preferably in the range of 9 to 30 g/10 min.

In a preferred embodiment, the propylene homopolymer (H-PP3) is thermo mechanically stable. Accordingly, it is preferred that the propylene homopolymer (H-PP3) has a melting temperature Tm of at least 160° C., more preferably at least 162° C., still more preferably at least 163° C. A reasonable upper limit for Tm is 170° C.

Preferably, the propylene homopolymer (H-PP3) according to the present invention is a propylene homopolymer known in the art. In particular, it is preferred that the propylene homopolymer (H-PP3) is one of the commercial propylene homopolymers HK060AE or HG265FB of Borealis AG.

Additionally, it is particularly preferred that the propylene homopolymer (H-PP3) is a high melt strength polypropylene (HMS-PP).

Preferably, the high melt strength polypropylene (HMS-PP) is a branched polypropylene. A branched polypropylene differs from a linear polypropylene that the polypropylene backbone covers side chains whereas a non-branched polypropylene, i.e. a linear polypropylene, does not cover side chains. The side chains have significant impact on the rheology of the polypropylene. Accordingly linear polypropylenes and branched polypropylenes can be clearly distinguished by its flow behavior under stress.

Thus, it is preferred that the high melt strength polypropylene (HMS-PP) has a $F_{30}$ melt strength of more than 5.8 cN, like of more than 5.8 to 20.0 cN, more preferably of more than 6.0 cN, still more preferably of 6.0 to 18.0 cN, yet more preferably of 6.2 to 15.0 cN, still yet more preferably of 6.0 to 13.0 cN or of 6.2 to 13.0 cN, most preferably of 6.0 to 12.0 cN or of 6.5 to 12.0 cN, like of 6.6 to 12.0 cN or 6.6 to 11.5 cN and a $v_{30}$ melt extensibility of more than 210 to 300 mm/s, like of more than 220 to 300 mm/s, more preferably of more than 225 mm/s, still more preferably of 225 to 300 mm/s, yet more preferably of 230 to 290 mm/s. The $F_{30}$ melt strength and the $v_{30}$ melt extensibility are measured according to ISO 16790:2005.

Additionally or alternatively the high melt strength polypropylene (HMS-PP) can be further defined by the strain hardening factor (SHF). Accordingly it is preferred that the instant polypropylene composition has a strain hardening factor (SHF) of at least 1.7, more preferably of at least 1.9, yet more preferably in the range of 1.9 to 7.0, still more preferably in the range of 1.9 to 6.5 measured at a strain rate of 3.0 $s^{-1}$ and a Hencky strain of 2.5.

Further it is preferred that the high melt strength polypropylene (HMS-PP) has a melt flow rate $MFR_2$ (230° C.) measured according to ISO 1133 of at least 2.0 g/10 min, more preferably in a range of 2.0 to 40.0 g/10 min, still more preferably in a range of 4.0 to 30.0 g/10 min, yet more preferably in a range of 5.0 to 20.0 g/10 min, like in the range of 7.0 to 13.0 g/10 min, like 8.0 to 12.0 g/10 min.

Preferably, the high melt strength polypropylene (HMS-PP) has a melting point of at least 130° C., more preferably of at least 135° C. and most preferably of at least 140° C. The crystallization temperature is preferably at least 110° C., more preferably at least 120° C.

The high melt strength polypropylene (HMS-PP) may additionally comprise unsaturated monomers. In other words the high melt strength polypropylene (HMS-PP) may comprise unsaturated units, like bifunctionally unsaturated monomer(s) and/or multifunctionally unsaturated low molecular weight polymer(s) being different to propylene. "Bifunctionally unsaturated" or "multifunctionally unsaturated" as used above means preferably the presence of two or more non-aromatic double bonds, as in e.g. divinylbenzene or cyclopentadiene or polybutadiene.

Accordingly in one preferred embodiment the high melt strength polypropylene (HMS-PP) comprises units derived from
(i) propylene and
(ii) bifunctionally unsaturated monomer(s) and/or multifunctionally unsaturated low molecular weight polymer(s)

The high melt strength polypropylene (HMS-PP) is obtained by treating a polypropylene (PP), preferably a linear polypropylene (l-PP), with thermally decomposing radical-forming agents. However in such a case a high risk exists that the polypropylene (PP), preferably the linear polypropylene (l-PP), is degraded, which is detrimental. Thus it is preferred that the chemical modification is accomplished by the additional use of bifunctionally unsaturated monomer(s) and/or multifunctionally unsaturated low molecular weight polymer(s) as chemically bound bridging unit(s). A suitable method to obtain the high melt strength polypropylene (HMS-PP) is for instance disclosed in EP 0 787 750, EP 0 879 830 A1 and EP 0 890 612 A2. All documents are herewith included by reference.

A process for the preparation of high melt strength polypropylenes (HMS-PP) applicable for the polypropylene composition (C) present invention is described by WO 2014/016206 A1.

Preferably, the propylene homopolymer (H-PP3) being a high melt strength polypropylene (HMS-PP) according to the present invention is a propylene homopolymer known in the art. In particular, it is preferred that the high melt strength polypropylene (HMS-PP) is the commercial propylene homopolymer WE100HMS of Borealis AG.

The Adhesion Promoter (AP)

In accordance with the present invention, the polypropylene composition (C) further comprises an adhesion promoter (AP). The adhesion promoter (AP) is specified as being a polar modified polypropylene (PM-PP) homo- or copolymer.

The polar modified polypropylene (PM-PP) homo- or copolymer comprises a low molecular weight compound having reactive polar groups. Modified polypropylene homopolymers and copolymers, like copolymers of propylene and ethylene or with other α-olefins, e.g. $C_4$ to $C_{10}$ α-olefins, are most preferred, as they are highly compatible with the crystalline polypropylene (PP) homo- or copolymers of the inventive polymer composition (PC).

In terms of structure, the polar modified polypropylene (PM-PP) homo- or copolymer are preferably selected from graft homo- or copolymers.

In this context, preference is given to polar modified polypropylene (PM-PP) homo- or copolymers containing groups derived from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, acrylic acid, maleic acid, fumaric acid, itaconic acid and mixtures thereof.

Particular preference is given to use a polypropylene homo- or copolymer grafted with maleic anhydride or acrylic acid as the polar modified polypropylene (PM-PP) homo- or copolymer, i.e. the adhesion promoter (AP).

The modified polymer, i.e. the adhesion promoter, can be produced in a simple manner by reactive extrusion of the polymer, for example with maleic anhydride or acrylic acid in the presence of free radical generators (like organic peroxides), as disclosed for instance in U.S. Pat. Nos. 4,506,056, 4,753,997 or EP 1 805 238.

Preferred amounts of groups derived from polar compounds in the polar modified polypropylene (PM-PP) homo- or copolymer, i.e. the adhesion promoter (AP), are from 0.5 to 10 wt.-%. For example, in the range of 0.5 wt.-% to 8 wt.-%, preferable in the range of 0.5 wt.-% to 6 wt.-%, more preferably in the range of 0.5 wt.-% to 4 wt.-% and most preferably in the range of 0.5 wt.-% to 3.5 wt.-%.

Preferred values of the melt flow rate $MFR_2$ (190° C.) for the polar modified polypropylene (PM-PP) homo- or copolymer, i.e. for the adhesion promoter (AP), are from 2 to 500 g/10 min. It is particularly preferred that the polar modified polypropylene (PM-PP) homo- or copolymer has a melt flow rate $MFR_2$ (190° C.) of at least 50 g/10 min.

In one preferred embodiment of the present invention, the adhesion promoter (AP) is a maleic anhydride modified polypropylene homo- or copolymer and/or an acrylic acid modified polypropylene homo- or copolymer. Preferably, the adhesion promoter (AP) is a maleic anhydride modified polypropylene homopolymer and/or an acrylic acid modified polypropylene homopolymer and preferably a maleic anhydride modified polypropylene homopolymer. For example, suitable polar modified polypropylene (PM-PP) homo- or copolymers include, for example, a polypropylene homopolymer grafted with maleic anhydride (PP-g-MAH) and a polypropylene homopolymer grafted with acrylic acid (PP-g-AA).

The Plastomer (PL)

According to a preferred embodiment of the present invention, the polypropylene composition (C) further comprises a plastomer (PL) being a copolymer of ethylene and a $C_4$ to $C_8$ α-olefin.

The plastomer (PL) can be any elastomeric polyolefin with the proviso that it chemically differs from the elastomeric propylene copolymer (E) as defined herein. More preferably the plastomer (PL) is a very low density polyolefin, still more preferably a very low density polyolefin polymerized using single site catalysis, preferably metallocene catalysis. Typically, the plastomer (PL) is an ethylene copolymer.

The plastomer (PL) has a density below 0.900 g/cm³. More preferably, the density of the plastomer (PL) is equal or below 0.890 g/cm³, still more preferably in the range of 0.845 to 0.890 g/cm³.

Preferably, the plastomer (PL) has a melt flow rate $MFR_2$ (190° C., 2.16 kg) of less than 50 g/10 min, more preferably from 10.0 to 40 g/10 min, still more preferably from 15.0 to 35 g/10 min, like a range from 25.0 to 33.0 g/10 min.

Preferably, the plastomer (PL) comprises units derived from ethylene and a C4 to C20 α-olefin.

The plastomer (PL) comprises, preferably consists of, units derivable from (i) ethylene and (ii) at least another C4 to C20 α-olefin, like C4 to C10 α-olefin, more preferably units derivable from (i) ethylene and (ii) at least another α-olefin selected form the group consisting of 1-butene, 1-pentene, 1-hexene, 1-heptene and 1-octene. It is especially preferred that the plastomer (PL) comprises at least units derivable from (i) ethylene and (ii) 1-butene or 1-octene. It is especially preferred that the plastomer (PL) is a copolymer of ethylene and 1-octene.

In an especially preferred embodiment, the plastomer (PL) consists of units derivable from ethylene and 1-octene.

The comonomer content, like the C4 to C20 α-olefin content, of the plastomer (PL) is in the range of 3.0 to 25.0 mol-%, more preferably in the range of 4.0 to 20.0 mol-%, still more preferably in the range of 5.0 to 15.0 mol-%, like in the range of 6.0 to 10.0 mol-%.

In one preferred embodiment the plastomer (PL) is prepared with at least one metallocene catalyst. The plastomer (PL) may also be prepared with more than one metallocene catalyst or may be a blend of multiple elastomers prepared with different metallocene catalysts. In some embodiments, the plastomer (PL) is a substantially linear ethylene polymer (SLEP). SLEPs and other metallocene catalysed plastomers (PL) are known in the art, for example, U.S. Pat. No. 5,272,236. These resins are also commercially available, for example, as Queo™ plastomers available from Borealis, ENGAGE™ plastomer resins available from Dow Chemical Co. or EXACT™ polymers from Exxon or TAFMER™ polymers from Mitsui.

However, it is preferred that the inventive polypropylene composition does not contain the plastomer (PL).

The Inorganic Filler (F)

As a further requirement of the composition according to this invention is the presence of an inorganic filler (F).

Preferably the inorganic filler (F) is a mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite talc and fibers.

The most preferred the inorganic fillers (F) are fibers.

Preferably the fibers are selected from the group consisting of glass fibers, metal fibers, ceramic fibers and graphite fibers. Glass fibers are especially preferred. The glass fibers may be either cut glass fibers or long glass fibers, although preference is given to using cut glass fibers, also known as short fibers or chopped strands.

The fibers have an average diameter of 20.0 µm or less.

More preferably, the fibers have an average diameter of 14.0 µm or less, like an average diameter in a range of 9.5 to 13.5 µm.

It is particularly preferred that the fibers have an average diameter of 11.5 µm or less, more preferably 11.0 µm or less, still more preferably 10.5 µm or less, such as 8.0 to 12.0 µm, 9.0 to 11.5 µm, or 10.0 to 11.0 µm.

In general, the glass fibers can have a length of from 1 to 50 mm. The cut or short glass fibers used in the fiber reinforced composition preferably have a length of from 1.0 to 10.0 mm, more preferably from 1.0 to 7.0 mm, and/or a diameter of from 8 to less than 12 µm, more preferably from 9 to 11.5 µm.

The polar modified polypropylene as adhesion promoter (AP) is applied in order to achieve a chemical reaction between the glass fibers and the adhesion promoter. As a result, the glass fibers can be easier and more uniformly dispersed in the polymer matrix.

According to this invention the filler (F) does not belong to the class of alpha nucleating agents and additives (AD).

The filler (F) is state of the art and a commercially available product.

The Additives

The polypropylene composition (C) of the present invention may include additives (AD). Typical additives are acid scavengers, antioxidants, colorants, light stabilisers, plasticizers, slip agents, anti-scratch agents, dispersing agents, processing aids, lubricants, pigments, fillers, and the like.

According to the instant invention, fillers (F) do not belong to the class of additives (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the polypropylene composition (C) of the invention does not comprise (a) further polymer (s) different to the heterophasic propylene copolymer (HECO1), the second propylene polymer (PP2), the adhesion promoter (AP) and the propylene homopolymer (H-PP3), in an amount exceeding 15 wt.-%, preferably in an amount exceeding 10 wt.-%, more preferably in an amount exceeding 9 wt.-%, based on the weight of the polypropylene composition (C). Any polymer being a carrier material for additives (AD) is not calculated to the amount of polymeric compounds as indicated in the present invention, but to the amount of the respective additive (AD).

The polymeric carrier material of the additives (AD) is a carrier polymer to ensure a uniform distribution in the composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The composition of the present invention is preferably used for the production of articles, more preferably of foamed articles. Even more preferred is the use for the production of automotive articles, especially of car interiors and exteriors, like bumpers, side trims, step assists, body panels, spoilers, dashboards, interior trims and the like.

The current invention also provides articles, more preferably foamed articles, comprising, preferably comprising at least 60 wt.-%, more preferably at least 80 wt.-%, yet more preferably at least 95 wt.-%, like consisting of, the inventive composition. Accordingly, the present invention is especially directed to parts of automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composition.

The Use

The present invention is also directed to the use of the inventive composition for the production of a foamed article as described in the previous paragraphs.

The present invention will now be described in further detail by the examples provided below.

EXAMPLES

1. Measuring Methods

The following definitions of terms and determination methods apply for the above general description of the invention as well as to the below examples unless otherwise defined. Calculation of comonomer content of the first elastomeric propylene copolymer fraction, i.e. the polymer produced in the second reactor (R2):

$$\frac{C(PP) - w(PP1) \times C(PP1)}{w(PP2)} = C(PP2) \quad (I)$$

wherein
w(PP1) is the weight fraction [in wt.-%] of the first propylene polymer fraction, i.e. the polymer produced in the first reactor (R1),
w(PP2) is the weight fraction [in wt.-%] of the first elastomeric propylene copolymer fraction, i.e. the polymer produced in the second reactor (R2),
C(PP1) is the comonomer content [in mol-%] of the first propylene polymer fraction, i.e. the polymer produced in the first reactor (R1),
C(PP) is the comonomer content [in mol-%] of the first propylene polymer and the first elastomeric propylene copolymer fraction, i.e. polymer produced in the first and second reactor (R1+R2),
C(PP2) is the calculated comonomer content [in mol-%] of the first elastomeric propylene copolymer fraction, i.e. the polymer produced in the second reactor (R2).

Calculation of comonomer content of the second elastomeric propylene copolymer fraction, i.e. the polymer produced in the second reactor (R2):

$$\frac{C(PP) - w(PP12) \times C(PP12)}{w(PP3)} = C(PP3) \quad (II)$$

wherein
w(PP12) is the weight fraction [in wt.-%] of the first propylene polymer fraction and the first elastomeric propylene copolymer fraction, i.e. the polymer produced in the first and second reactor (R1+R2),
w(PP3) is the weight fraction [in wt.-%] of second elastomeric propylene copolymer fraction, i.e. the polymer produced in the third reactor (R3),
C(PP12) is the comonomer content [in mol-%] of the first propylene polymer fraction and the first elastomeric propylene copolymer fraction, i.e. the polymer produced in the first and second reactor (R1+R2),
C(PP) is the comonomer content [in mol-%] of the first propylene polymer fraction, the first elastomeric propylene copolymer fraction and the second elastomeric propylene copolymer fraction, i.e. polymer produced in the first, second and third reactor (R1+R2+R3),
C(PP3) is the calculated comonomer content [in mol-%] of the second elastomeric propylene copolymer fraction, i.e. the polymer produced in the second reactor (R2).

Calculation of the xylene cold soluble (XCS) content of the elastomeric propylene copolymer fraction, i.e. the polymer produced in the second and third reactor (R2+R3):

$$\frac{XS(HECO) - w(PP1) \times XS(PP1)}{w(E)} = XS(E) \quad (III)$$

wherein
w(PP1) is the weight fraction [in wt.-%] of the first propylene polymer fraction, i.e. the polymer produced in the first reactor (R1), w(E) is the weight fraction [in wt.-%] of the elastomeric propylene copolymer fraction, i.e. the polymer produced in the second and third reactor (R2+R3)
XS(PP1) is the xylene cold soluble (XCS) content [in wt.-%] of the first propylene polymer fraction, i.e. the polymer produced in the first reactor (R1),
XS(HECO) is the xylene cold soluble (XCS) content [in wt.-%] of the first propylene polymer fraction, the first elastomeric propylene copolymer fraction and the second elastomeric propylene copolymer fraction, i.e. polymer produced in the first, second reactor and third reactor (R1+R2+R3),
XS(E) is the calculated xylene cold soluble (XCS) content [in wt.-%] of the elastomeric propylene copolymer fraction, i.e. the polymer produced in the second and third reactor (R2+R3).

Calculation of the xylene cold soluble (XCS) content of the first elastomeric propylene copolymer fraction, i.e. the polymer produced in the second reactor (R2):

$$\frac{XS(PP) - w(PP1) \times XS(PP1)}{w(PP2)} = XS(PP2) \quad (IV)$$

wherein
w(PP1) is the weight fraction [in wt.-%] of the first propylene polymer fraction, i.e. the polymer produced in the first reactor (R1),
w(PP2) is the weight fraction [in wt.-%] of the first elastomeric propylene copolymer fraction, i.e. the polymer produced in the second reactor (R2)
XS(PP1) is the xylene cold soluble (XCS) content [in wt.-%] of the first propylene polymer fraction, i.e. the polymer produced in the first reactor (R1),
XS(PP) is the xylene cold soluble (XCS) content [in wt.-%] of the first propylene polymer fraction and the first elastomeric propylene copolymer fractions, i.e. polymer produced in the first and second reactor (R1+R2),
XS(PP2) is the calculated xylene cold soluble (XCS) content [in wt.-%] of the first elastomeric propylene copolymer fraction, i.e. the polymer produced in the second reactor (R2).

Calculation of the xylene cold soluble (XCS) content of the second elastomeric propylene copolymer fraction, i.e. the polymer produced in the third reactor (R3):

$$\frac{XS(PP) - w(PP12) \times XS(PP12)}{w(PP3)} = XS(PP3) \quad (V)$$

wherein
w(PP12) is the weight fraction [in wt.-%] of the first propylene polymer fraction and the first elastomeric propylene copolymer fraction, i.e. the polymer produced in the first reactor and second reactor (R1+R2),
w(PP3) is the weight fraction [in wt.-%] of the second elastomeric propylene copolymer fraction, i.e. the polymer produced in the third reactor (R3)
XS(PP12) is the xylene cold soluble (XCS) content [in wt.-%] of the first propylene polymer fraction and the first elastomeric propylene copolymer fraction, i.e. the polymer produced in the first and second reactor (R1+R2),
XS(PP) is the xylene cold soluble (XCS) content [in wt.-%] of the first propylene polymer fraction and the first and second elastomeric propylene copolymer fractions, i.e. polymer produced in the first, second reactor and third reactor (R1+R2+R3), XS(PP3) is the calculated xylene cold soluble (XCS) content [in wt.-%] of the second elastomeric propylene copolymer fraction, i.e. the polymer produced in the third reactor (R3).

Calculation of melt flow rate $MFR_2$ (230° C.) of the first elastomeric propylene copolymer fraction, i.e. the polymer produced in the second reactor (R2):

$$MFR(PP2) = 10^{\left[\frac{\log(MFR(PP))-w(PP1)\times \log(MFR(PP1))}{w(PP2)}\right]} \quad (VI)$$

wherein w(PP1) is the weight fraction [in wt.-%] of the first propylene polymer fraction, i.e. the polymer produced in the first reactor (R1), w(PP2) is the weight fraction [in wt.-%] of the first elastomeric propylene copolymer fraction, i.e. the polymer produced in the second reactor (R2), MFR(PP1) is the melt flow rate $MFR_2$ (230° C.) [in g/10 min] of the first propylene polymer fraction, i.e. the polymer produced in the first reactor (R1), MFR(PP) is the melt flow rate $MFR_2$ (230° C.) [in g/10 min] of the first propylene polymer and the elastomeric first propylene copolymer fraction, i.e. the polymer produced in the first and second reactor (R1+R2), MFR(PP2) is the calculated melt flow rate $MFR_2$ (230° C.) [in g/10 min] of the first propylene copolymer fraction, i.e. the polymer produced in the second reactor (R2).

Calculation of melt flow rate $MFR_2$ (230° C.) of the second elastomeric propylene copolymer fraction, i.e. the polymer produced in the third reactor (R3):

$$MFR(PP3) = 10^{\left[\frac{\log(MFR(PP))-w(PP12)\times \log(MFR(PP12))}{w(PP3)}\right]} \quad (VII)$$

wherein w(PP12) is the weight fraction [in wt.-%] of the first propylene polymer fraction and the first elastomeric propylene copolymer fraction, i.e. the polymer produced in the first and second reactor (R1+R2), w(PP3) is the weight fraction [in wt.-%] of second elastomeric propylene copolymer fraction, i.e. the polymer produced in the third reactor (R3), MFR(PP12) is the melt flow rate $MFR_2$ (230° C.) [in g/10 min] of the first propylene polymer fraction and the first elastomeric propylene copolymer fraction, i.e. the polymer produced in the first and second reactor (R1+R2), MFR(PP) is the melt flow rate $MFR_2$ (230° C.) [in g/10 min] of the first propylene polymer, the first elastomeric propylene copolymer fraction and the second elastomeric propylene copolymer fraction, i.e. the polymer produced in the first, second and third reactor (R1+R2+R3), MFR(PP3) is the calculated melt flow rate $MFR_2$ (230° C.) [in g/10 min] of the second elastomeric propylene copolymer fraction, i.e. the polymer produced in the third reactor (R3).

Calculation of the intrinsic viscosity of the xylene soluble fraction of the first elastomeric propylene copolymer fraction, i.e. the polymer produced in the second reactor (R2):

$$\frac{IV(PP) - XCS(PP1) \times IV(PP1)}{XCS(PP2)} = IV(PP2) \quad (VI)$$

wherein

XCS(PP1) is the xylene soluble fraction [in wt.-%] of the first propylene polymer fraction, i.e. the polymer produced in the first reactor (R1), XCS(PP2) is the xylene soluble fraction [in wt.-%] of the first elastomeric propylene copolymer fraction, i.e. the polymer produced in the second reactor (R2), IV(PP1) is the intrinsic viscosity [in dl/g] of the xylene soluble fraction of the first propylene polymer fraction, i.e. the polymer produced in the first reactor (R1), IV(PP) is the intrinsic viscosity [in dl/g] of the xylene soluble fraction of the first propylene polymer and the first elastomeric propylene copolymer fraction, i.e. polymer produced in the first and second reactor (R1+R2), IV(PP2) is the calculated intrinsic viscosity [in dl/g] of the xylene soluble fraction of the first elastomeric propylene copolymer fraction, i.e. the polymer produced in the second reactor (R2).

Calculation of the intrinsic viscosity of the xylene soluble fraction of the second elastomeric propylene copolymer fraction, i.e. the polymer produced in the third reactor (R3):

$$\frac{IV(PP) - XCS(PP12) \times IV(PP12)}{XCS(PP3)} = IV(PP3) \quad (VII)$$

wherein

XCS(PP12) is the xylene soluble fraction [in wt.-%] of the first propylene polymer fraction and the first elastomeric propylene copolymer fraction, i.e. the polymer produced in the first and second reactor (R1+R2), XCS(PP3) is the xylene soluble fraction [in wt.-%] of second elastomeric propylene copolymer fraction, i.e. the polymer produced in the third reactor (R3), IV(PP12) is the intrinsic viscosity [in dl/g] of the xylene soluble fraction of the first propylene polymer fraction and the elastomeric first propylene copolymer fraction, i.e. the polymer produced in the first and second reactor (R1+R2), IV(PP) is the intrinsic viscosity [in dl/g] of the xylene soluble fraction of the first propylene polymer fraction, the first elastomeric propylene copolymer fraction and the second elastomeric propylene copolymer fraction, i.e. polymer produced in the first, second and third reactor (R1+R2+R3), IV(PP3) is the calculated intrinsic viscosity [in dl/g] of the xylene soluble fraction of the second elastomeric propylene copolymer fraction, i.e. the polymer produced in the third reactor (R3).

Calculation of comonomer content of the elastomeric propylene copolymer fraction, i.e. the polymer produced in the second and third reactor (R2+R3):

$$\frac{C(HECO) - w(PP) \times C(PP)}{w(E)} = C(E) \quad (VIII)$$

wherein
- w(PP) is the weight fraction [in wt.-%] of the first propylene polymer, i.e. polymer produced in the first reactor (R1),
- w(E) is the weight fraction [in wt.-%] of the first elastomeric propylene copolymer fraction and the second elastomeric propylene copolymer fraction, i.e. of the polymer produced in the second and third reactor (R2+R3),
- C(PP) is the comonomer content [in mol-%] of the first propylene polymer, i.e. polymer produced in the first reactor (R1),
- C(HECO) is the comonomer content [in mol-%] of the propylene copolymer, i.e. is the comonomer content [in mol-%] of the polymer obtained after polymerization in the third reactor (R3),
- C(E) is the calculated comonomer content [in mol-%] of the first elastomeric propylene copolymer fraction and the second elastomeric propylene copolymer fraction, i.e. of the polymer produced in the second and third reactor (R2+R3).

$MFR_2$ (230° C.) is measured according to ISO 1133 (230° C., 2.16 kg load).

$MFR_2$ (190° C.) is measured according to ISO 1133 (190° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28.5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W.-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

[21$e$]mol %=100*($P_{21e}/P_{total}$)

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W.-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W.-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol \%]=100*fE$$

The weight percent comonomer incorporation was calculated from the mole fraction:

$$E[wt \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4: 2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 μl of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Intrinsic viscosity is measured according to DIN ISO 1628/1, October 1999 (in Decalin at 135° C.).

Density is measured according to ISO 1183-187. Sample preparation is done by compression moulding in accordance with ISO 1872-2:2007.

The xylene solubles (XCS, wt.-%): Content of xylene cold solubles (XCS) is determined at 25° C. according ISO 16152; first edition; 2005-07-01. The part which remains insoluble is the xylene cold insoluble (XCI) fraction.

Ash content is measured according to ISO 3451-1 (1997) standard.

$F_{30}$ Melt Strength and $v_{30}$ Melt Extensibility

The test described herein follows ISO 16790:2005.

The strain hardening behaviour is determined by the method as described in the article "Rheotens-Mastercurves and Drawability of Polymer Melts", M. H. Wagner, Polymer Engineering and Science, Vol. 36, pages 925 to 935. The content of the document is included by reference. The strain hardening behaviour of polymers is analysed by Rheotens apparatus (product of Göttfert, Siemensstr.2, 74711 Buchen, Germany) in which a melt strand is elongated by drawing down with a defined acceleration.

The Rheotens experiment simulates industrial spinning and extrusion processes. In principle a melt is pressed or extruded through a round die and the resulting strand is hauled off. The stress on the extrudate is recorded, as a function of melt properties and measuring parameters (especially the ratio between output and haul-off speed, practically a measure for the extension rate). For the results presented below, the materials were extruded with a lab extruder HAAKE Polylab system and a gear pump with cylindrical die (L/D=6.0/2.0 mm). The gear pump was pre-adjusted to a strand extrusion rate of 5 mm/s, and the melt temperature was set to 200° C. The spinline length between die and Rheotens wheels was 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand drawn down is 120 mm/sec². The Rheotens was operated in combination with the PC program EXTENS. This is a real-time data-acquisition program, which displays and stores the measured data of tensile force and drawdown speed. The end points of the Rheotens curve (force versus pulley rotary speed) is taken as the $F_{30}$ melt strength and drawability values.

Strain Hardening Factor (SHF)

The strain hardening factor is defined as wherein $$SHF = \frac{\eta_E^+(t, \varepsilon)}{\eta_{LVE}^+(t)} = \frac{\eta_E^+(t, \varepsilon)}{3\eta^+(t)}$$

$\eta_E^+(t,\varepsilon)$ is the uniaxial extensional viscosity; and $\eta_{LVE}^+(t)$ is three times the time dependent shear viscosity $\eta^+(t)$ in the linear range of deformation.

The determination of the linear viscoelastic envelop in extension $\eta_{LVE}^+(t)$, using IRIS Rheo Hub 2008, required the calculation of the discrete relaxation time spectrum from the storage and loss modulus data (G', G" (ω)). The linear viscoelastic data (G', G" (ω)) is obtained by frequency sweep measurements undertaken at 180° C. for polypropylene or at 140° for polyethylene, on a Anton Paar MCR 300 coupled with 25 mm parallel plates. The underlying calculation principles used for the determination of the discrete relaxation spectrum are described in Baumgärtel M, Winter H H, "Determination of the discrete relaxation and retardation time spectra from dynamic mechanical data", Rheol. Acta 28:511519 (1989) which is incorporated by reference in its entirety.

IRIS RheoHub 2008 expresses the relaxation time spectrum as a sum of N Maxwell modes $$\overset{o}{G}(t) = G_e \cdot \sum_1^N g_i \cdot e^{-\frac{t}{\lambda_i}}$$

wherein $g_i$ and $\lambda_i$ are material parameters and $G_e$ is the equilibrium modulus.

The choice for the maximum number of modes, N used for determination of the discrete relaxation spectrum, is done by using the option "optimum" from IRIS RheoHub 2008. The equilibrium modulus $G_e$ was set at zero. The non-linear fitting used to obtain $\eta_{LVE}^+(t)$ is performed on IRIS Rheo Hub 2008, using the Doi-Edwards model.

The uniaxial extensional viscosity, $\eta_E^|(t,\varepsilon)$ is obtained from uniaxial extensional flow measurements, conducted on an Anton Paar MCR 501 coupled with the Sentmanat extensional fixture (SER-1). The temperature for the uniaxial extensional flow measurements was set at 180° C., applying extension (strain) rates $\partial\varepsilon/\partial t$ ranging from 0.3 s$^{-1}$ to 10 s$^{-1}$ and covering a range of Hencky strain $\varepsilon = ln[(l-l_0)/l_0]$, with $l_0$ being the original and l the actual sample fixation length, from 0.3 to 3.0. Particularly care was taken for the preparation of the samples for extensional flow. The samples were prepared by compression moulding at 230° C. followed by slow cooling to room temperature (forced water or air cooling were not used). This procedure allowed obtaining well shaped samples free of residual stresses. The sample was left for some minutes at the testing temperature to ensure thermal stability (set temperature±0.1° C.), before carrying out the uniaxial extensional flow measurements.

Maximum force, energy to maximum force, puncture energy were determined according to ISO 6603-2 on 210× 148×X (A5) specimen cut from the center of injection moulded plaques with dimensions of 400×200 mm. The test was performed at room temperature on a support of 100 mm diameter where the test specimen was hit with a lubricated striker (diameter of 20 mm) at impact speed of 4.4 m/s. The 400×200 mm plaques were produced on an Engel Duo 450 injection moulding machine with a film gate on the small side. Foamed plates were generated via the physical Mucell foaming technology using supercritical nitrogen gas as a blowing agent. The injection-foaming was performed with 1 mm opening stroke i.e. foamed plates with 3 mm thickness were produced. For the sake of comparison 2 mm thick compact parts were produced, as well . . . .

2. Examples

Polymerization of the heterophasic propylene copolymer (HECO1) and the second propylene polymer (PP2) was performed in continuous mode in a Borstar PP pilot plant with one loop and two gas phase reactors.

The catalyst used in the polymerization process for the heterophasic propylene copolymer (HECO1) used in the inventive examples is the commercial catalyst ZN104 of Basell used along with dicyclopentyl dimethoxy silane (D-Donor) as donor and Triethylaluminium (TEAL) as co-catalyst.

The catalyst used in the polymerization process for the second propylene polymer (PP2) used in the inventive examples is the commercial catalyst ZN M1 of Basell used along with cyclohexylmethyl dimethoxy silane (C-Donor) as donor.

TABLE 1

Preparation of HECO1 and PP2

| | | HECO1 | PP2 |
|---|---|---|---|
| Prepolymerization | | | |
| TEAL/Ti | [mol/mol] | 220 | 260 |
| TEAL/donor | [mol/mol] | 30 | 10 |
| Temperature | [° C.] | 20 | 30 |
| res. time | [h] | 0.1 | 0.08 |
| Loop | | | |
| Temperature | [° C.] | 70 | 75 |
| Pressure | [kPa] | 5520 | 5300 |
| Split | [%] | 64 | |
| H2/C3 ratio | [mol/kmol] | 15 | 12 |
| C2/C3 ratio | [mol/kmol] | 0 | 0 |
| MFR$_2$ | [g/10 min] | 85 | 75 |
| XCS | [wt.-%] | 2.0 | 2.6 |
| C2 content | [mol-%] | 0.0 | 0.0 |
| GPR 1 | | | |
| Temperature | [° C.] | 80 | |
| Pressure | [kPa] | 1600 | |
| Split | [%] | 13 | |
| H2/C2 ratio | [mol/kmol] | 120 | |
| C2/C3 ratio | [mol/kmol] | 510 | |
| MFR$_2$ | [g/10 min] | 32 | |
| XCS | [wt.-%] | 25 | |
| C2 content | [mol-%] | 9.0 | |
| GPR 2 | | | |
| Temperature | [° C.] | 80 | |
| Pressure | [kPa] | 1450 | |
| Split | [%] | 23 | |
| C2/C3 ratio | [mol/kmol] | 1400 | |
| H2/C2 ratio | [mol/kmol] | 280 | |
| MFR$_2$ | [g/10 min] | 18.0 | |
| XCS | [wt.-%] | 29.0 | |
| IV (XCS) | [dl/g] | 2.7 | |
| C2 (XCS) | [mol-%] | 48.0 | |
| C2 content | [mol-%] | 11.1 | |

| | |
|---|---|
| C2 | ethylene |
| H2/C3 ratio | hydrogen/propylene ratio |
| C2/C3 ratio | ethylene/propylene ratio |
| H2/C2 ratio | hydrogen/ethylene ratio |
| GPR 1/2/3 | 1st/2nd/3rd gas phase reactor |
| Loop | Loop reactor |

HECO1 and PP2 were mixed in a twin-screw extruder with 0.2 wt.-% of Irganox B225 (1:1-blend of Irganox 1010 (Pentaerythrityl-tetrakis(3-(3',5'-di-tert.butyl-4-hydroxy-toluyl)-propionate and tris (2,4-di-t-butylphenyl) phosphate) phosphite) of BASF AG, Germany) and 0.1 wt.-% calcium stearate, respectively.

Preparation of the Composition (C)

HECO1, PP2 and optionally one or more H-PP components were melt blended on a co-rotating twin screw extruder with the adhesion promoter (AP), plastomer (PL), glass fibers and carbon black. The polymer melt mixture was discharged and pelletized.

TABLE 2

Properties of comparative and inventive examples

| | | CE1 | CE2 | IE1 | IE2 | IE3 |
|---|---|---|---|---|---|---|
| HECO1 | [wt.-%] | 28.0 | — | 28.0 | 28.0 | 28.0 |
| PP2 | [wt.-%] | 14.6 | — | 49.6 | 34.6 | 39.6 |
| GF | [wt.-%] | 20.0 | 20.0 | 20.0 | 20.0 | 20.0 |

TABLE 2-continued

Properties of comparative and inventive examples

|  |  | CE1 | CE2 | IE1 | IE2 | IE3 |
|---|---|---|---|---|---|---|
| AP | [wt.-%] | 1.5 | 1.5 | 1.5 | 1.5 | 1.5 |
| CB | [wt.-%] | 0.5 | 0.5 | 0.5 | 0.5 | 0.5 |
| AO | [wt.-%] | 0.4 | 0.4 | 0.4 | 0.4 | 0.4 |
| H-PP3a | [wt.-%] | 15.0 | 67.6 |  |  |  |
| H-PP3b | [wt.-%] |  |  |  | 15.0 |  |
| H-PP3c | [wt.-%] | 20.0 |  |  |  | 10.0 |
| PL | [wt.-%] |  | 10.0 |  |  |  |
| Ash content | [wt.-%] | 20.0 | 20.0 | 19.7 | 19.8 | 20.0 |
| MFR | [g/10 min] | 9.1 | 27.3 | 12.0 | 12.6 | 11.8 |
| Maximum Force | [N] | 527 | 533 | 574 | 551 | 632 |
| Energy to Maximum Force | [J] | 2.2 | 1.5 | 2.5 | 2.0 | 2.7 |
| Puncture Energy | [J] | 8.8 | 7.6 | 8.9 | 9.3 | 9.8 |
| Cell structure | [—] | coarse | coarse | regular | regular | regular |

GF is the commercial product ECS 03 T-480H of Nippon Electric Glass Co., Ltd. having a filament diameter of 10.5 μm and a strand length of 3 mm.
AP is the adhesion promoter SCONA TPPP 8112 GA by Scona being a polypropylene functionalized with maleic anhydride having a maleic anhydride content of 1.4 wt.-% and a MFR (190° C.) above 80 g/10 min.
CB is a masterbatch of 70 wt % of low density polyethylene (LDPE) and 30 wt % carbon black, with MFR (190°/21.6 kg) of 2 g/10 min.
AO is an antioxidant blend comprising ADK-STAB A-611 by ADK, Anox BB 011 by Chemtura, Evernox B110 by Everspring, Hostanox M 101 by Clariant, Irganox B 225 by BASF, Kinox-B25 by HPL Additives and Songnox 11B by Songwon.
H-PP3a is the commercial propylene homopolymer HK060AE of Borealis, a visbroken grade based on Ziegler-Natta catalyst, having a melt flow rate MFR$_2$ (230° C.) of 125 g/10 min and XCS content of 2.8 wt %
H-PP3b is the commercial propylene homopolymer HG265FB of Borealis, a reactor grade based on Ziegler-Natta catalyst, having a melt flow rate MFR$_2$ (230° C.) of 26 g/10 min and XCS content of 2.6 wt %
H-PP3c is the commercial propylene homopolymer WE100HMS of Borealis, a long-chain branched high melt strength polypropylene (HMS-PP) produced by reactive modification in accordance to WO 2014/016206 A1. It has a melt flow rate MFR$_2$ (230° C.) of 10 g/10 min and an F30 melt strength of 8.0 cN in combination with a melt extensibility v30 of >200 mm/s as determined in a Rheotens test as described in WO 2014/016206 A1.
PL is the commercial ethylene-octene copolymer Queo8230 of Borealis having a density of 0.880 g/cm³, a melt flow rate MFR$_2$ (190° C.) of 30.0 g/10 min and an 1-octene content of 7.0 mol-%.

The invention claimed is:

1. A polypropylene composition (C), comprising:
   a) at least 20 wt. %, based on the overall weight of the polypropylene composition (C), of a heterophasic propylene copolymer (HECO1) comprising:
      i) a matrix (M) comprising a first propylene polymer (PP1), and
      ii) an elastomeric propylene copolymer (E),
   b) at least 30 wt. %, based on the overall weight of the polypropylene composition (C), of a second propylene polymer (PP2),
   c) a propylene homopolymer (H-PP3) having a melt flow rate MFR$_2$ (230° C.) determined according to ISO 1133 below 50 g/10 min,
   d) an adhesion promoter (AP), and
   e) an inorganic filler (F),
   wherein said first propylene polymer (PP1) and said second propylene polymer (PP2) have melt flow rates MFR$_2$ (230° C.) determined according to ISO 1133 above 50 g/10 min.

2. The polypropylene composition (C) according to claim 1, wherein the heterophasic propylene copolymer (HECO1) has a melt flow rate MFR$_2$ (230° C.) determined according to ISO 1133 in the range of 10 to 30 g/10 min.

3. The polypropylene composition (C) according to claim 2, comprising:
   a) 20 to 40 wt. % of the heterophasic propylene copolymer (HECO1) comprising the first propylene copolymer (PP1) and the elastomeric propylene copolymer (E),
   b) 30 to 55 wt. % of the second propylene polymer (PP2),
   c) 5 to 25 wt. % of the propylene homopolymer (H-PP3),
   d) 0.5 to 5 wt. % of the adhesion promoter (AP), and
   e) 10 to 30 wt. % of the inorganic filler (F),
   based on the overall weight of the polypropylene composition (C).

4. The polypropylene composition (C) according to claim 1, wherein the inorganic filler (F) is glass fibers.

5. The polypropylene composition (C) according to claim 1, wherein the adhesion promoter (AP) is a polar modified polypropylene (PM-PP) being a propylene homo- or copolymer grafted with maleic anhydride having a melt flow rate MFR (190° C.) determined according to ISO 1133 of at least 50 g/10 min.

6. The polypropylene composition (C) according to claim 1, wherein the heterophasic propylene copolymer (HECO1) has:
   i) a comonomer content in the range of 5.0 to 35.0 mol %, and/or
   ii) a xylene soluble fraction (XCS) in the range of 15.0 to 40.0 wt. %,
   based on the overall weight of the heterophasic propylene copolymer (HECO1).

7. The polypropylene composition (C) according to claim 1, wherein the heterophasic propylene copolymer (HECO1) has an intrinsic viscosity of the xylene soluble fraction (XCS) measured according to ISO 1628/1 (at 135° C. in decalin) in the range of 1.0 to 4.5 dl/g.

8. The polypropylene composition (C) according to claim 1, wherein the first propylene polymer (PP1) and/or the second propylene polymer (PP2) are propylene homopolymers.

9. The polypropylene composition (C) according to claim 1, wherein the elastomeric propylene copolymer (E) is a copolymer of propylene and ethylene.

10. The polypropylene composition (C) according to claim 1, having a melt flow rate MFR$_2$ (230° C.) determined according to ISO 1133 in the range of 8 to 30 g/10 min.

11. The polypropylene composition (C) according to claim 1, wherein said polypropylene composition (C) is a foamable polypropylene composition.

12. A foamed article, comprising the polypropylene composition (C) according to claim 1.

13. The foamed article according to claim 12, wherein said foamed article is an automotive article.

* * * * *